United States Patent [19]

Kikuchi

[11] Patent Number: 4,778,687

[45] Date of Patent: Oct. 18, 1988

[54] METHOD OF PROCESSING FISHES

[75] Inventor: Isao Kikuchi, Sapporo, Japan

[73] Assignee: Satoh Suisan Kabushiki Kaisha, Hokkaido, Japan

[21] Appl. No.: 59,809

[22] Filed: Jun. 9, 1987

[30] Foreign Application Priority Data

Jun. 11, 1986 [JP] Japan .................................. 61-136414

[51] Int. Cl.$^4$ ........................ A22C 25/08; A23L 1/325
[52] U.S. Cl. .................................... 426/412; 426/129; 426/513; 426/643
[58] Field of Search ............... 426/643, 129, 392, 113, 426/132, 513, 510, 511, 523, 412; 425/436 R

[56] References Cited

U.S. PATENT DOCUMENTS 4,544,561 10/1985 Komukai .............................. 426/643
4,674,967 6/1987 Oseka ................................ 425/436 R Primary Examiner—George Yeung

[57] ABSTRACT

According to a method of processing fish based on the present invention, a cloth is placed on a scrolling bamboo sheet, on which sliced pieces of fish are placed uniformly in several layers. The scrolling bamboo sheet is then rolled up with the sliced pieces contained inside. After completion of rolling, caps are pushed into and fixed onto both ends of the bamboo sheet, then the assembly of the bamboo sheet and the sliced pieces of fish are heated.

4 Claims, 1 Drawing Sheet

FIG. 1
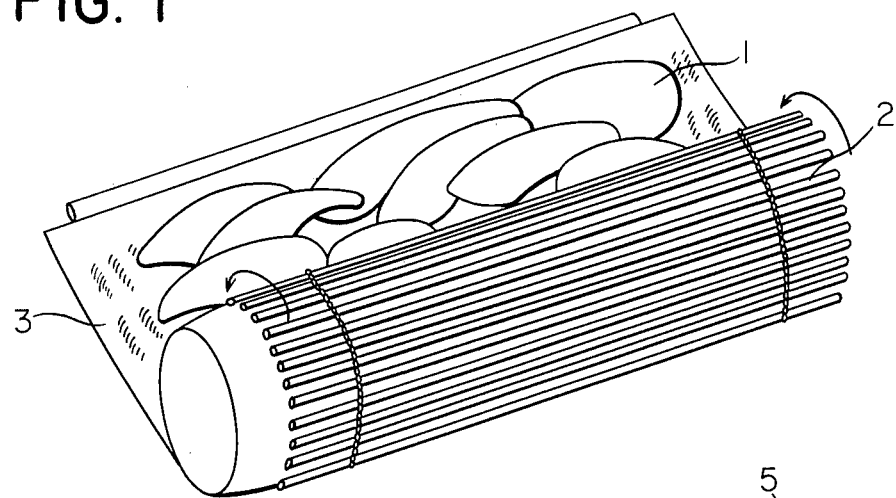
FIG. 2
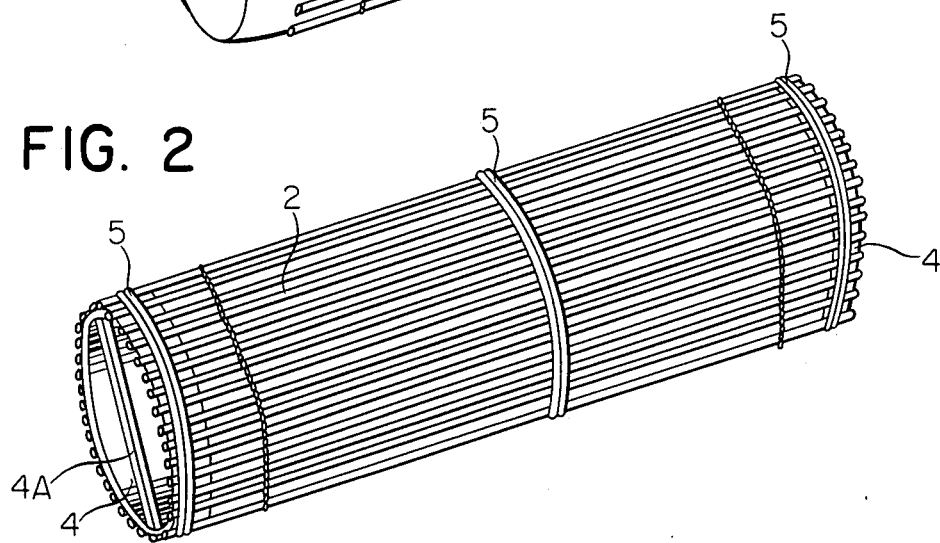
FIG. 3
FIG. 4
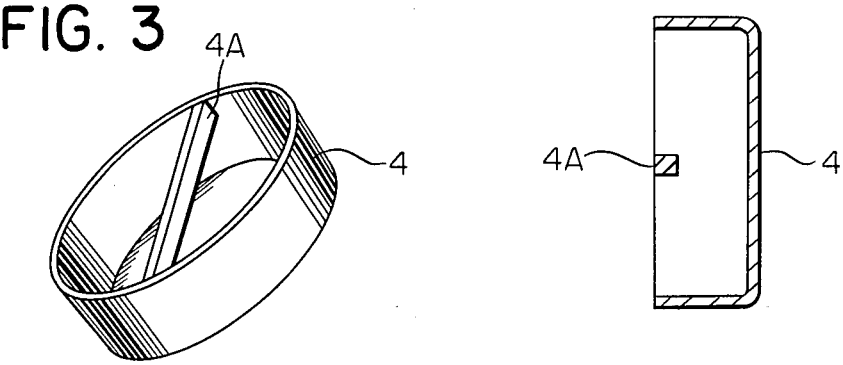

METHOD OF PROCESSING FISHES

BACKGROUND OF THE INVENTION

This invention relates to a method of processing fishes, in which anybody can roll fishes to a specified size using a scrolling bamboo sheet (known in Japanese as "Makisu") and caps.

Methods for processing fishes for foods known in the prior art, include broiling, steaming, boiling and frying whole or cut fishes. According to these methods, it is troublesome to remove skin and bones of the fishes for eating. In addition, fishes are often canned, in which fishes are processed at high temperature and pressure according to conventional methods. Therefore, original taste or deliciousness of raw fishes cannot be fully preserved. According to another method of processing fishes known in the prior art, fishes are ground, where the flavor of the raw material can be preserved. However, eating impression can no longer be maintained, while limiting the types of fishes applicable to grinding.

DETAILED DESCRIPTION OF THE INVENTION

A first object of the present invention is to serve fishes without requiring to remove bones, etc. for simple eating.

A second object of the present invention is to provide the dish of fishes without containing skin or bones, while preserving the taste, deliciousness and eating impression of original fishes together with a constant shape.

A third object of the present invention is to process fishes available for simple dining, while removing bones or skin but maintaining the original taste, deliciousness and eating impression with a constant shape.

The first feature of the present invention is described as follows. First, a cloth is seated on the scrolling bamboo sheet and, on the upper face of the cloth, laterally cut pieces of fishes are set by stacking. Then, the stacked fish pieces are scrolled with the bamboo sheet while the scrolled bamboo sheet is heated. The second feature of the present invention is to plug caps at both ends of the scrolled bamboo sheet after completion of scrolling up the cut fish pieces. Both ends of the inner rolled part are shaped, after which the cut pieces of fish are heated with the scrolled bamboo sheet wrapped therearound.

These features of this invention will be understood deeper by the following description referring to the drawings.

FIG. 1 shows an oblique view when the bamboo sheet is being rolled.

FIG. 2 denotes an oblique view of completely rolled state.

FIG. 3 is an oblique view of the cap.

FIG. 4 indicates the section of the cap.

DETAILED DESCRIPTION OF PREFERRED EMBODIMENT OF THE INVENTION

A method of processing salmon is described as an example.

Step 1

First, the salmon is filleted and removed of skin and bones.

Step 2

Next, these fillets are sliced into wide and thin cut pieces 1 (FIG. 1) of 5-10 mm width.

Step 3

A cloth 3, such as Kanreisha, is placed on scrolling bamboo sheet 2 and coated with oil.

Step 4

Several layers of thin cut pieces 1 are stacked over the entire upper surface of oil coated cloth 3. If spice treatment is required according to the type of fish, cut pieces 1 are duly treated with the spice.

Step 5

After the above, both ends of bamboo sheet 2 are held while rolling up this sheet in the direction of the arrow shown in FIG. 1. After completion of rolling, the cut pieces in bamboo sheet are completely rolled up. Then, stainless steel caps 4,4 are pushed inside of both ends of cloth 3, exposed from both ends of rolled bamboo sheet 2, as shown in FIG. 2. Thereby, both ends of the rolled fish are shaped.

A handle 4A is attached to the apertures of the each cap, as shown in FIGS. 3 and 4.

Step 6

After the above, rubber rings 5,5 are wrapped onto the outer ends of the bamboo sheet for fixing caps 4,4 to both ends of rolled bamboo sheet 2. In addition, rubber ring 5 is wrapped at the center of the bamboo sheet to prevent unrolling.

Step 7

Bamboo sheet 2, in the state of FIG. 2, is steamed (or boiled) 50-60 minutes with steam (or hot water).

Step 8

After completion of steaming (boiling), rolled bamboo sheet 2 is cooled then unrolled and removed of cloth 3. Thus, cylindrically rolled salmon with clean finish at both ends is completed.

Because of complete heating, the rolled salmon is not deformed even after removing the bamboo sheet while maintaining the original shape. In addition, the salmon can be served very easily because of absence of skin and bones.

I claim:

1. A method of processing fish comprising placing a cloth on a scrolling bamboo sheet, stacking a plurality of pieces of sliced fish on the cloth, rolling up the scrolling bamboo sheet and heating the rolled sheet to set the fish into a formed shape.

2. The method of claim 1 further comprising the step of placing a cap at each end of the rolled bamboo sheet to form the fish into a cylindrically shaped roll prior to heating.

3. The method of claim 1 further comprising the step of coating the cloth with oil before stacking the fish thereon.

4. The method of claim 2 further comprising the step of coating the cloth with oil before stacking the fish thereon.

* * * * *